(12) United States Patent
Kimoto

(10) Patent No.: US 7,733,508 B2
(45) Date of Patent: Jun. 8, 2010

(54) COMMUNICATION TERMINAL DEVICE AND COMMUNICATION METHOD

(75) Inventor: Osamu Kimoto, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 918 days.

(21) Appl. No.: 11/538,367

(22) Filed: Oct. 3, 2006

(65) Prior Publication Data

US 2007/0127081 A1 Jun. 7, 2007

(30) Foreign Application Priority Data

Dec. 7, 2005 (JP) ............... 2005-354010

(51) Int. Cl.
G06F 15/00 (2006.01)
G06K 1/00 (2006.01)
G06K 15/00 (2006.01)
G06F 3/12 (2006.01)

(52) U.S. Cl. .................. 358/1.14; 358/1.15

(58) Field of Classification Search .......... 358/1.1, 358/1.15, 1.14, 1.13; 710/16–18, 31, 33, 710/46, 47
See application file for complete search history.

(56) References Cited

U.S. PATENT DOCUMENTS

| | | |
|---|---|---|
| 5,168,376 A | 12/1992 | Motohama |
| 5,587,810 A | 12/1996 | Feldman |
| 5,734,704 A | 3/1998 | Matsueda et al. |
| 6,097,504 A | 8/2000 | Nobuta |

2005/0110616 A1 * 5/2005 Kajiwara ............... 340/286.01

FOREIGN PATENT DOCUMENTS

| | | |
|---|---|---|
| EP | 0881816 A2 | 12/1998 |
| JP | 02121555 A | 5/1990 |
| JP | 02244978 A | 9/1990 |
| JP | 03094871 U | 9/1991 |
| JP | 05-003521 | 1/1993 |
| JP | 05003521 A | 1/1993 |
| JP | 05183716 A | 7/1993 |
| JP | 06062206 A | 3/1994 |
| JP | 07154569 A | 6/1995 |
| JP | 08107436 A | 4/1996 |
| JP | 2001218004 A | 8/2001 |
| JP | 2001-309146 | 11/2001 |
| JP | 2001320590 A | 11/2001 |

OTHER PUBLICATIONS

European Search Report for corresponding European application No. 06120765.0-2202 lists the references above.

(Continued)

*Primary Examiner*—Douglas Q Tran
(74) *Attorney, Agent, or Firm*—Hogan & Hartson LLP

(57) ABSTRACT

A microprocessor unit of a communication terminal device determines whether or not a destination terminal is a communication terminal manufactured by a same manufacturer as the communication terminal device in accordance with a manufacturer code transmitted from the destination terminal. A display unit displays a message to notify a determination result to a transmitter and to urge the transmitter to perform a selection operation for executing or canceling a transmission of image data. When the transmitter selects a function key displayed on the display unit in accordance with the message, the microprocessor unit executes or cancels the transmission of the image data.

20 Claims, 5 Drawing Sheets

OTHER PUBLICATIONS

Japanese language office action and its English language translation for corresponding Japanese application 2006310544 lists the references above.

Japanese language office action and its English language translation for corresponding Japanese application 2006310544 lists the reference above.

* cited by examiner

FIG. 5A

MANUFACTURED COUNTRY AND MANUFACTURER OF DESTINATION TERMINAL IS THE SAME AS MANUFACTURED COUNTRY AND MANUFACTURER OF THIS TERMINAL.

TRANSMIT IMAGE DATA?

YES  NO

FIG. 5B

MANUFACTURER OF DESTINATION TERMINAL IS DIFFERENT FROM MANUFACTURER OF THIS TERMINAL.

TRANSMIT IMAGE DATA?

YES  NO

COMMUNICATION TERMINAL DEVICE AND COMMUNICATION METHOD

RELATED APPLICATIONS

This application claims the benefit of priority under 35 USC 119 of Japanese patent application no. 2005-354010, filed on Dec. 7, 2005, which application is hereby incorporated by reference in its entirety.

BACKGROUND OF THE INVENTION

1. Field of the Invention

The present invention relates to a communication terminal device which receives a manufacturer code from a destination terminal connected for transmitting image data.

2. Description of the Related Art

When carrying out a fax transmission, a conventional fax machine receives a manufacturer code from a destination terminal connected based on an entry of a calling number, and a control unit of the fax machine determines whether or not the received manufacturer code is registered in a storage unit. When the manufacturer code is registered in the storage unit, a display unit displays a manufacturer name registered in the storage unit by being associated with the manufacturer code. Therefore, an operator at a transmitting end can look at the manufacturer name displayed on the display unit to roughly determine whether or not a currently connected destination terminal is a proper destination of the fax transmission. When the displayed manufacturer name of the destination terminal is different from a correct manufacturer name, the transmission of the image data can be canceled by pressing a stop key of an operation panel.

To display the manufacturer name of the destination terminal on the display unit of the fax machine, the storage unit is required to previously register a manufacturer code and a manufacturer name of the destination terminal. Therefore, when carrying out a fax transmission to a first-time destination, since a manufacturer code or a manufacturer name of the destination terminal is not registered in the storage unit, the display unit cannot display the manufacturer name of the destination terminal. Thus, when the operator at the transmitting end attempts to transmit a fax to a first-time destination, the operator cannot determine whether or not a connected destination terminal is a proper destination terminal.

In the above-described conventional fax machine, unless the operator presses the stop key of the operation panel under a state in which the manufacturer name is displayed on the display unit, the control unit determines that the destination is a proper destination and the image data is transmitted. Therefore, when carrying out a fax transmission to a first-time destination terminal, there are cases in which the image data is transmitted to a wrong destination terminal without the operator being able to confirm the manufacturer name of the destination terminal from the display unit.

SUMMARY OF THE INVENTION

In order to overcome the problems described above, the present invention provides a communication terminal device which can reliably prevent transmission of image data to a destination terminal connected by a mistake due to a wrong calling number being entered or due to a communication error.

According to an aspect of the present invention, a communication terminal device includes a receiving unit, a determination unit, a notification unit, an operation unit, and a transmission control unit. The receiving unit receives a manufacturer code from a destination terminal connected for transmitting image data. The determination unit determines whether or not the destination terminal is a communication terminal manufactured by a same manufacturer as the communication terminal device in accordance with the manufacturer code received by the receiving unit. The notification unit notifies a determination result of the determination unit to an operator, and urges the operator to perform a selection operation for selecting an execution or a suspension of the transmission of the image data. The operation unit is performed by the operator for carrying out the selection operation to select either the execution or a suspension of the transmission of the image data. The transmission control unit executes or cancels the transmission of the image data in accordance with the selection operation performed on the operation unit when the selection operation is being urged.

According to another aspect of the present invention, the communication terminal device also includes a secondary determination unit. The secondary determination unit determines whether or not the destination terminal is a communication terminal manufactured in the same country as the communication terminal device from a manufactured country code received from the destination terminal. The notification unit notifies a determination result of the secondary determination unit to the operator, and urges the operator to perform a selection operation for selecting either the execution or the suspension of the transmission of the image data.

According to another aspect of the present invention, the transmission control unit cancels the transmission of the image data when a set time elapses under a state in which the selection operation is not performed with respect to the operation unit.

According to another aspect of the present invention, the communication terminal device also includes a transmission restricting unit. The transmission restricting unit permits the transmission of the image data when a passcode entered by the operator matches with a passcode registered in the communication terminal device, and when this passcode is approved by the destination terminal and the passcode received from the destination terminal matches with the passcode registered in the communication terminal device.

According to the invention, the receiving unit receives the manufacturer code from the destination terminal connected based on an entry of a calling number. The determination unit determines whether or not the destination terminal is a communication terminal manufactured by the same manufacturer as the communication terminal device in accordance with the received manufacturer code. Therefore, even when the destination terminal is a first-time destination, the operator at the transmitting end can learn whether or not the destination terminal is a communication terminal manufactured by the same manufacturer as the communication terminal device prior to the transmission of the image data. The operator can determine whether or not the destination terminal is a proper destination terminal from such information, and select either to execute or cancel the transmission of the image data in accordance with the determination result. Thus, it is possible to more reliably prevent the transmission of the image data to a destination terminal connected by mistake due to a wrong calling number being entered or due to a communication error.

According to the invention, the communication terminal device includes the secondary determination unit which determines whether or not the destination terminal is a communication terminal manufactured in the same country as the communication terminal device in accordance with the manufactured country code received from the destination terminal. The notification unit preferably notifies the determination result of the secondary determination unit to the operator at the transmitting end, and urges the operator to perform a selection operation for selecting either the execution or the suspension of the transmission of the image data. In this case, the secondary determination unit determines whether or not the destination terminal is a communication terminal manufactured in the same country as the communication terminal device in accordance with the manufactured country code of the destination terminal connected based on the entry of the calling number. Therefore, even when the destination terminal is a first-time destination, the operator can learn whether or not the destination terminal is a communication terminal manufactured in the same country as the communication terminal device prior to the transmission of the image data. The operator can determine whether or not the destination terminal is a proper destination terminal, and select either to execute or cancel the transmission of the image data based on the determination result. Thus, it is possible to even more reliably prevent the transmission of the image data to a destination terminal connected by mistake due to a wrong calling number being entered or due to a communication error.

When the set time elapses under a state in which the selection operation is not performed with respect to the operation unit, the operation control unit preferably cancels the transmission of the image data. In this case, after the operator at the transmitting end learns whether or not the destination terminal is manufactured by the same manufacturer as the communication terminal device, when the operator cannot instantly determine either to execute or cancel the transmission of the image data, it is possible to prevent the operator from transmitting the image data unintentionally. As a result, it is possible to even more reliably prevent the transmission of the image data to a destination terminal connected by mistake.

According to the invention, the communication terminal device preferably includes the transmission restricting unit which permits the transmission of the image data when the passcode entered by the operator matches with the passcode registered in the communication terminal device and when this passcode is approved by the destination terminal and the passcode received from the destination terminal matches with the passcode registered in the communication terminal device. In this case, the destination terminal of the image data is confirmed by the passcode being entered by the operator at the transmitting end, and exchanging and approving the passcode of the communication terminal device and the destination terminal. Thus, it is possible to even more reliably prevent the transmission of the image data to a wrong destination terminal.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 5A and FIG. 5B are front views of a display unit displaying a message and function keys according to the present invention.

DETAILED DESCRIPTION OF PREFERRED EMBODIMENTS

With reference to FIGS. 1-5B, an MFP as a communication terminal device according to the present invention is described. The MFP includes a copy function, a scanner function, and a fax function.

Figure 4:
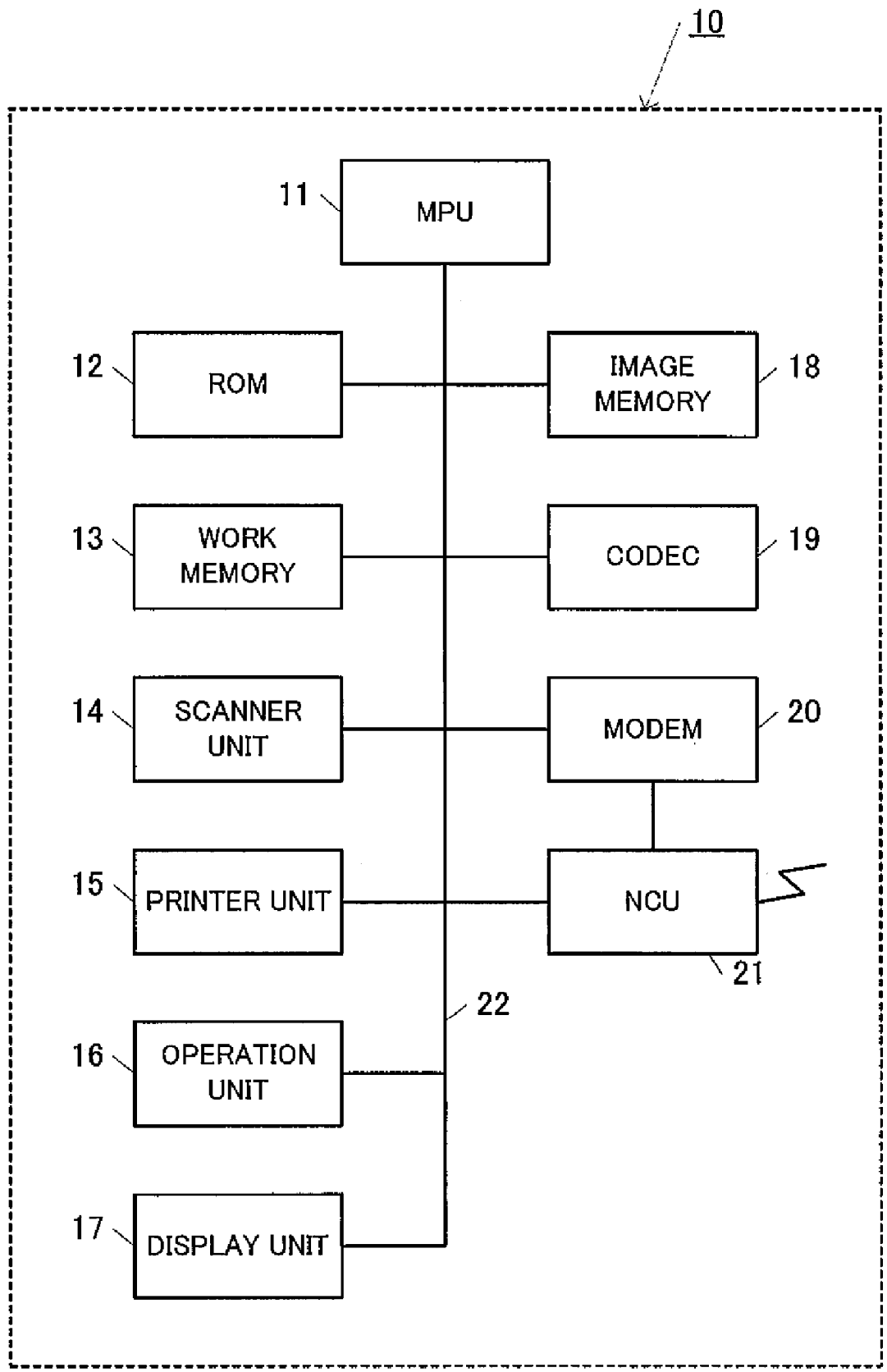
FIG. 4 is a block diagram of the MFP of the present invention.

As illustrated in FIG. 4, an MFP 10 includes a Micro Processing Unit (MPU) 11, a Read Only Memory (ROM) 12, a work memory 13, a scanner unit 14, a printer unit 15, an operation unit 16, a display unit 17, an image memory 18, a Coder-Decoder (CODEC) 19, a Modulator-Demodulator (MODEM) 20, and a Network Control Unit (NCU) 21 or the like. Each of the units 11 through 21 is connected via a bus 22. In one embodiment, the MPU 11 and the display unit 17 constitute a notification unit, and the MPU 11 and the operation unit 16 constitute an operation unit. The MPU 11 is also a determination unit, a transmission control unit, a secondary determination unit, and a transmission restricting unit.

The MPU 11 controls each of the units of the MFP 10 in accordance with a program and various pieces of information stored in the ROM 12. The work memory 13 includes a flash memory or the like. The work memory 13 temporarily stores various pieces of information relating to the MFP 10. The scanner unit 14 includes a flat bed scanner or the like. The scanner unit 14 scans an image of an original document placed on a platen glass of the flat bed scanner, and outputs image data of binary of black and white. The printer unit 15 includes an electrophotographic printer. The printer unit 15 prints an image received by fax, and an image of an original document scanned by the scanner unit 14 in a copy mode onto paper fed from one of a plurality of paper cassettes.

The operation unit 16, which is operated by an operator, includes a mode key (not illustrated) for switching a mode between a copy mode, a scanner mode and a fax mode; a start button (not illustrated) for starting a copy operation, a scanner operation or a fax transmission operation; and a ten-key numeric pad (not illustrated) for entering numerals of a telephone number or the like. The operation unit 16 also includes a touch-screen display for displaying a function key used for carrying out various settings for each mode. The display unit 17 including the touch-screen display displays an operation status or the like of the MFP 10. The image memory 18 temporarily stores image data received by fax or image data scanned from an original document by the scanner unit 14 in the fax mode. The image memory 18 temporarily stores image data scanned from the original document by the scanner unit 14 in the copy mode or the scanner mode.

The CODEC 19 encodes and decodes image data for fax transmission and reception or the like. The MODEM 20 modulates transmission data and demodulates received data in accordance with a fax transmission control protocol. The NCU 21 includes a function for controlling a connection with a Public Switched Telephone Network (PSTN) and transmitting a dial signal corresponding to a telephone number of a destination, and a function for detecting an incoming call.

Figure 1:
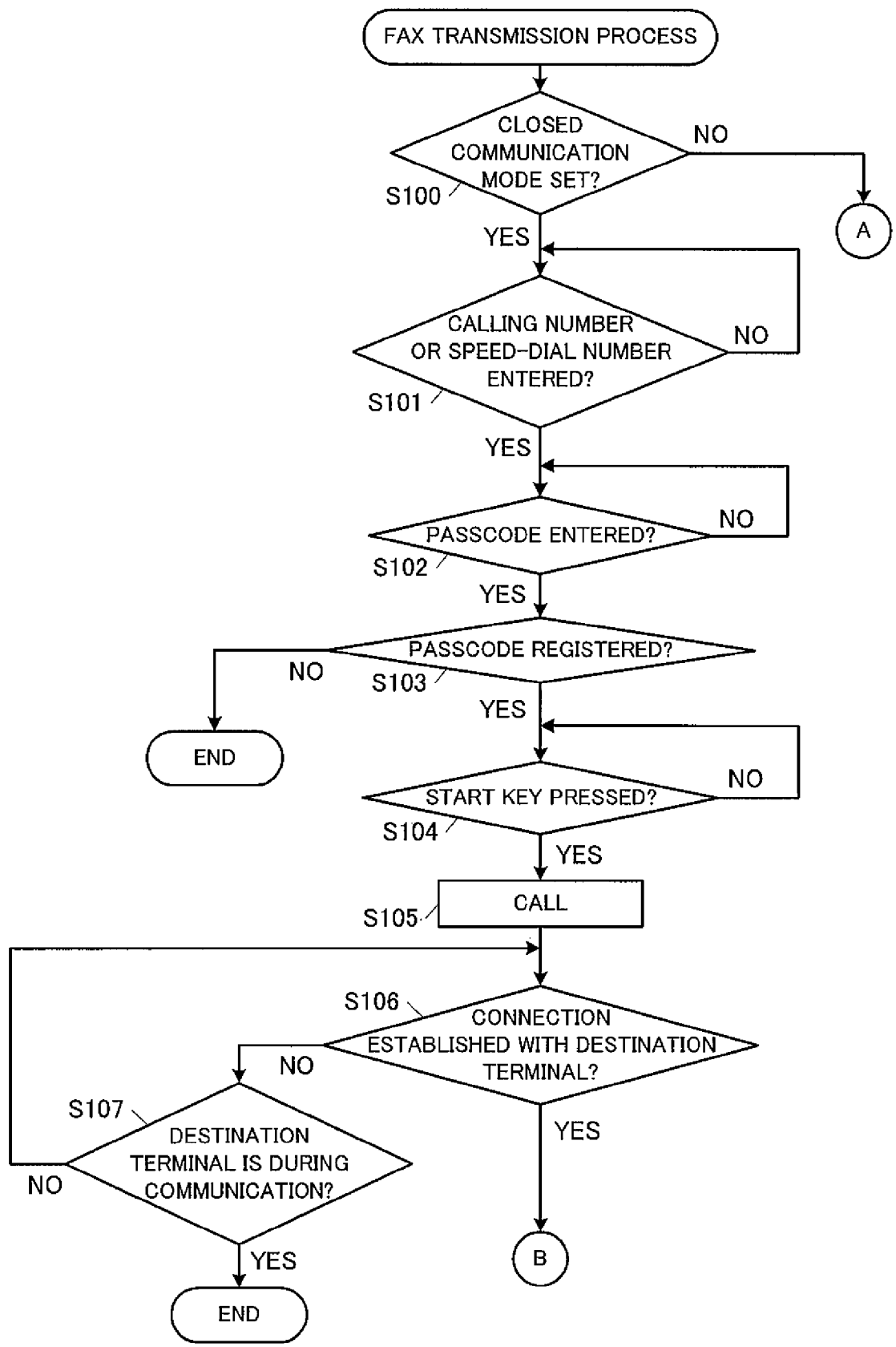
FIG. 1 is a flowchart illustrating a part of a fax transmission process executed by a Multi Function Peripheral (MFP) according to the present invention.
Figure 2:
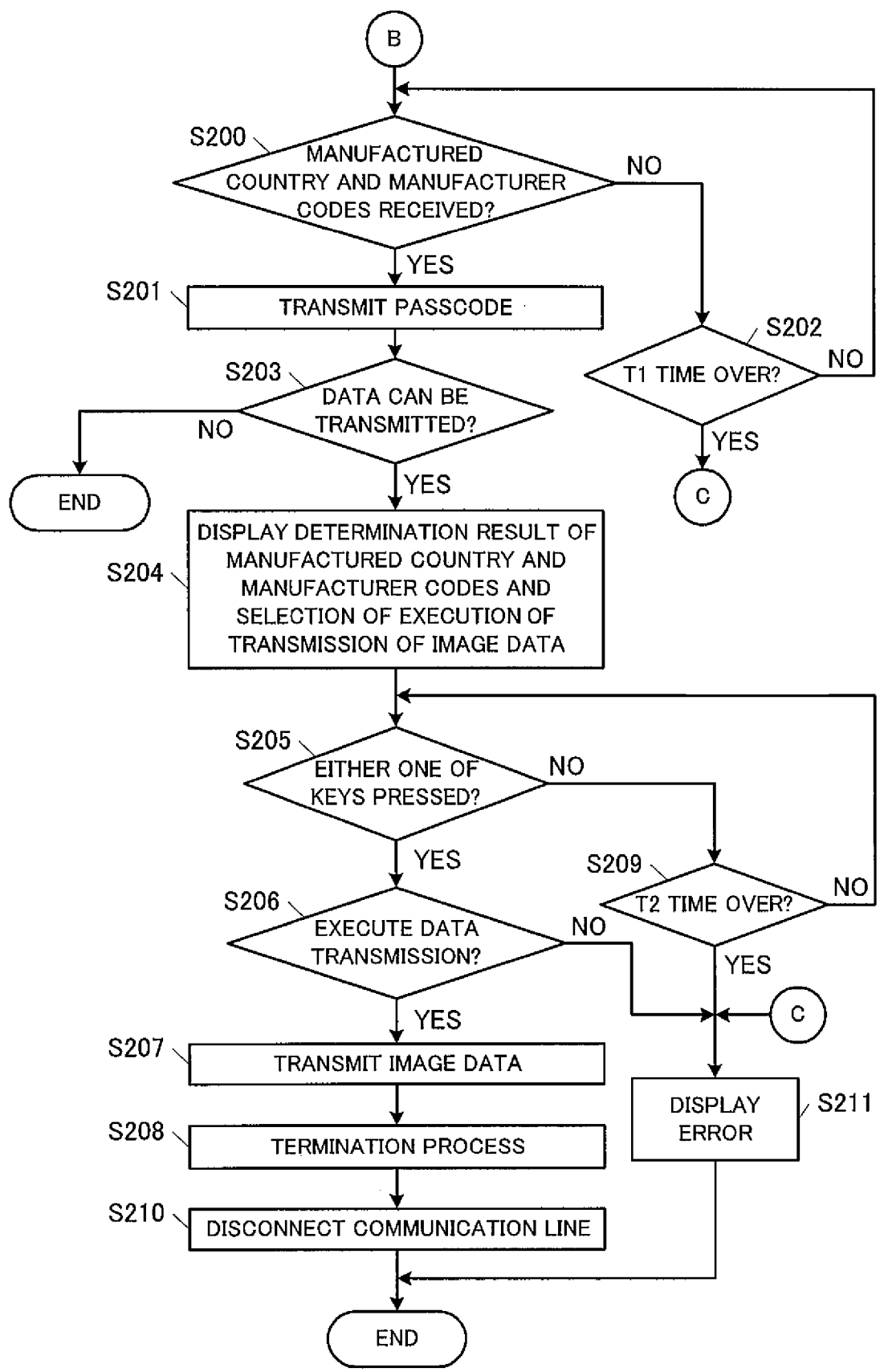
FIG. 2 is a flowchart illustrating another part of the fax transmission process executed by the MFP of the present invention.
Figure 3:
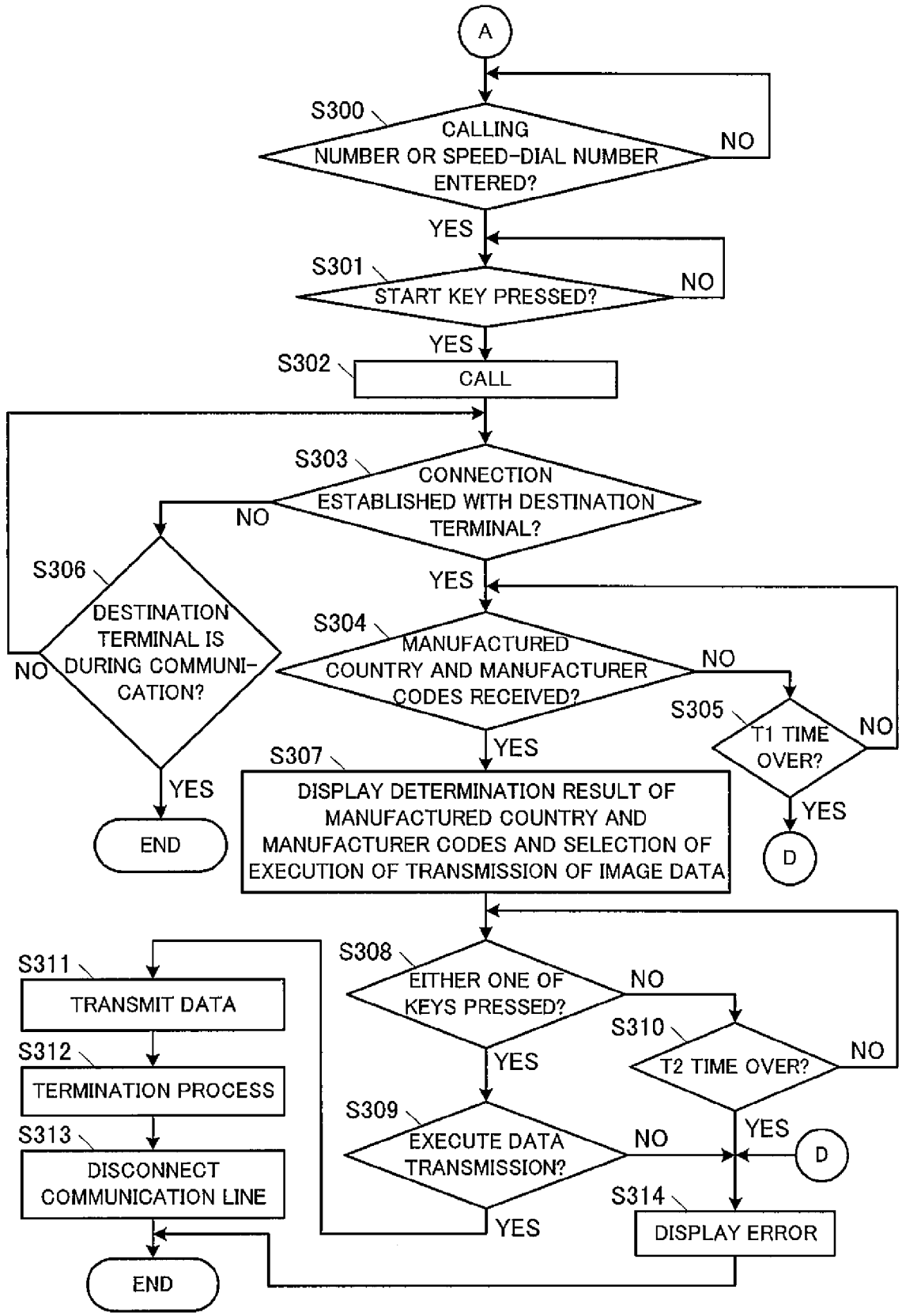
FIG. 3 is a flowchart illustrating another part of the fax transmission process executed by the MFP of the present invention.

Next, with reference to the flowcharts of FIGS. 1-3, a fax transmission process executed by the MPU 11 by a program stored in the ROM 12 is described. This fax transmission process is executed after an image of an original document is scanned by the scanner unit 14 in the fax mode and image data of the scanned image is stored in the image memory 18.

In the fax transmission process, first, a determination is carried out at step S100 as to whether or not a closed communication mode has been set. Under the closed communication mode, when carrying out a fax transmission, a passcode is exchanged between a transmitter terminal and a destination terminal, and each terminal verifies a passcode received from the other terminal with a passcode previously registered in itself. Then, data is transmitted and received. That is, under the closed communication mode, the fax transmission and reception can be carried out only between communication thermals in which an identical passcode is previously registered. Accordingly, it is possible to prevent image data from being transmitted to a wrong destination which has been connected due to a wrong calling number being entered by an operator at a transmitting end or due to a communication error.

When a determination is made at step S100 that the closed communication mode is set, next, at step S101, a determination is carried out as to whether or not a calling number or a speed-dial number has been entered by the operator using the ten-key numeric pad. When a determination is made at step S101 that a calling number or a speed-dial number has been entered, next, at step S102, a determination is carried out as to whether or not a passcode has been entered for the closed communication. When a determination is made at step S102 that the passcode has been entered, next, at step S103, a determination is carried out as to whether or not the entered passcode is registered in a passcode storage region of the work memory 13. When a determination is made at step S103 that the entered passcode is not registered, the fax transmission process is terminated.

When a determination is made at step S103 that the entered passcode is registered, next, at step S104, a determination is carried out as to whether or not the operator has pressed the start key. When a determination is made at step S104 that the start key has been pressed, next, at step S105, the calling number designated at step S101 is transmitted to a communication line. After step S105, a determination is carried out at step S106 as to whether or not a connection has been established with a destination terminal in accordance with whether or not a called station identification signal (hereinafter the "CED signal") has been received from the destination terminal. When a determination is made at step S106 that a connection has not been established with the destination terminal, next, a determination is carried out at step S107 as to whether or not the destination terminal is during communication. When the destination terminal is during communication, the fax transmission process is terminated once. In this case, after a prescribed period of time elapses from the termination, the process of step S105 and onward is repeated. Then, when a connection cannot be established with the destination terminal even after executing the process of step S105 and onward for a prescribed number of times, the fax transmission process is terminated.

When a determination is made at step S106 that a connection has been established with the destination terminal, next, a determination is carried out at step S200 as to whether or not a Non-Standard Facilities (NSF) signal has been received from the destination terminal, i.e., whether or not the manufacture country code and the manufacturer code have been received. When the reception of the NSF signal cannot be confirmed at step S200, by executing the process of steps S202 and S200, the MPU 11 monitors whether or not a prescribed set time T1 has elapsed for not receiving the NSF signal from when a connection has been established with the destination terminal. When the set time T1 elapses, at step S211, the display unit 17 displays a message indicating that the fax transmission process has resulted in a transmission error. Then, the fax transmission process ends. Meanwhile, when the reception of the NSF signal is confirmed at step S200, at step S201, the passcode entered at step S102 is transmitted to the destination terminal. When the destination terminal receives the passcode, the destination terminal determines whether or not the received passcode matches with a passcode previously registered in the destination terminal. When the passcode matches, the destination terminal transmits the passcode registered in the destination terminal to the transmitter terminal.

Next, at step S203, a determination is carried out as to whether or not the passcode has been received from the destination terminal. When the passcode has been received, a determination is carries out as to whether or not the received passcode matches with the passcode previously registered in the MFP 10. When a passcode has not been received from the destination terminal, or when the received passcode does not match with the passcode previously registered in the MFP 10, a determination is made that the destination terminal is different from a terminal intended by the transmitter. Then, the fax transmission process ends.

Meanwhile, when the passcode received from the destination terminal matches with the passcode previously registered in the MFP 10, a determination is made at step S203 that the destination terminal is a terminal expected by the transmitter. In this case, a determination is carried out at step S204 as to whether or not a manufactured country code and a manufacturer code of the destination terminal included in the NSF signal are identical with a manufactured country code and a manufacturer code of the MFP 10. When the manufactured country code and the manufacturer code of the destination terminal match with the manufactured country code and the manufacturer code of the MFP 10, the display unit 17 displays a message 17a indicating that a manufactured country and a manufacturer of the destination terminal is the same as a manufactured country and a manufacturer of the MFP 10 as illustrated in FIG. 5A for example. At the same time, the display unit 17 displays the message 17a urging the operator to select whether or not to transmit image data to the destination terminal. In this case, the display unit 17 displays a function key 17b for the operator to select an execution of the transmission of the image data and a function key 17c for the operator to select a suspension of the transmission of the image data.

When the manufacturer code of the destination terminal does not match with the manufacturer code of the MFP 10 at step S204, the display unit 17 displays the message 17a indicating that the manufacturer of the destination terminal is not the same as the manufacturer of the MFP 10 as illustrated in FIG. 5B for example. At the same time, the display unit 17 displays the message 17a urging the operator to select whether or not to transmit the image data to the destination terminal. In this case, the display unit 17 displays the function key 17b for the operator to select the execution of the transmission of the image data, and the function key 17c for the operator to select the suspension of the transmission of the image data. Further, when a determination is made at step S204 that the manufactured country code of the destination terminal does not match with the manufactured country code of the MFP 10, the display unit 17 displays a message indicating that the manufactured country code of the destination terminal does not match with the manufactured country code of the MFP 10 in the same manner as illustrated in FIG. 5B.

Next, a determination is carried out at step S205 as to whether or not either the function key 17b or 17c displayed on the display unit 17 has been pressed. When a determination is made that neither the function key 17b nor 17c has been pressed, a determination is carried out at step S209 as to whether or not a preset set time T2 has elapsed from when the message is displayed at step S204. When a determination is made at step S209 that the set time T2 has elapsed, the process of step S211 is executed. Then, the fax transmission process is terminated.

Meanwhile, when a determination is made at step S205 that either the function key 17b or 17c has been pressed, a determination is carried out at step S206 as to which one of the function keys 17b and 17c has been pressed. When a determination is made that the function key 17b has been pressed, a determination is made that the destination to which the operator attempts to transmit the image data is the same as the currently connected destination terminal. In this case, the image data is transmitted to the destination terminal at step S207. Next, at step S208, after an End Of Procedure (EOP) signal is transmitted to the destination terminal, a determination is carried out as to whether or not a Message Confirmation (MCF) signal has been received from the destination terminal. Next, at step S210, a Disconnect (DCN) signal is transmitted to the destination terminal, and the communication line is disconnected.

When a determination is made at step S206 that the operator has pressed the function key 17c, a determination is made that the destination to which the operator attempts to transmit the image data is different from the currently connected destination terminal. In this case, after the process of step S211 is executed, the fax transmission process is terminated.

When the closed communication mode is not set at step S100, the process proceeds onto a normal communication mode illustrated in FIG. 3. The processes that are the same as the processes of steps S101 through S208 in the closed communication mode are executed at steps S300 through S310. However, under the normal communication mode, unlike the closed communication mode, the passcode is not exchanged or verified between the MFP 10 and the destination terminal. Also in the normal communication mode, a process that is the same as the process of step S204 of the closed communication mode is executed at step S307. That is, a determination is carried out as to whether or not the destination terminal is a communication terminal manufactured in the same country by the same manufacturer as the MFP 10 from the manufacturer code of the destination terminal. In addition, the determination result is notified to the operator, and the operator is urged to perform a selection operation for selecting either an execution or a suspension of the transmission of the image data. Then, a process that is the same as the processes of steps S205 and S206 of the closed communication mode is executed at steps S308 and S309. That is, the display unit 17 displays the message 17a, and the image data is transmitted or the transmission of the image data is canceled according to the selection operation performed on the function key 17b or 17c.

As described above, in the MFP 10 according to the present invention, the MPU 11 determines whether or not the destination terminal is a communication terminal manufactured in the same country by the same manufacturer as the MFP 10 in accordance with the manufacturer code transmitted from the destination terminal. The destination result is notified to the transmitter by the message 17a displayed on the display unit 17, and the message 17a urges the operator at the transmitting end to select either the execution or the suspension of the transmission of the image data. When the operator selects either the function key 17b or 17c displayed on the display unit 17 along with the message 17a, the transmission of the image data is executed or canceled by the MPU 11. Therefore, even when the destination terminal is a first-time destination, the operator can learn prior to the transmission of the image data whether or not the destination terminal is a communication terminal manufactured in the same country by the same manufacturer as the MFP 10. The operator can determine whether or not the destination terminal is an appropriate destination terminal from the information. In addition, the operator can select either to execute or cancel the transmission of the image data in accordance with the determination result. Thus, it is possible to more reliably prevent the image data from being transmitted to a wrong destination which has been connected due to a wrong calling number being entered or due to a communication error.

When the set time T2 elapses under a state in which the function key 17b or 17c is not operated after the display unit 17 displays a message urging the operator to select either the execution or the suspension of the transmission of the image data, the MPU 11 cancels the transmission of the image data. Therefore, even when the transmitter learns whether or not the destination terminal is manufactured in the same country by the same manufacturer as the transmitter terminal, if a determination cannot be made instantly as to whether to execute or cancel the transmission of the image data, the operator can prevent the image data from being transmitted unintentionally. Thus, it is possible to even more reliably prevent the image data from being transmitted to a wrong destination terminal.

In the MFP 10 according to the invention, when the operator of the transmitter sets the closed communication mode, a determination is carried out as to whether or not the passcode entered by the operator matches with the passcode registered in the MFP 10 and whether or not the passcode has been approved by the destination terminal. Furthermore, when the destination terminal approves the passcode and the MFP 10 receives the passcode from the destination terminal, a determination is carried out as to whether or not the received passcode matches with the passcode registered in the MFP 10. When the passcode received from the destination terminal matches with the passcode of the MFP 10, the MPU 11 executes the transmission of the image data. Therefore, the destination terminal can be confirmed by an entry of the passcode made by the operator of the transmitting end and by exchanging and approving the passcode of the MFP 10 and the destination terminal. Thus, it is possible to even more reliably prevent the transmission of the image data to a wrong destination terminal.

Further, the present invention may be modified as follows. For example, in place of the display unit 17, the notification unit may be a voice generator that uses synthesized voice to notify the operator at the transmitting end as to whether or not the destination terminal has been manufactured in the same country by the same manufacturer as the MFP 10. As another example, either the manufactured country or the manufacturer of the destination terminal may be verified with the manufactured country or the manufacturer of the MFP 10.

While the present invention has been described with respect to embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A communication terminal device comprising:
means for receiving a manufacturer code from a destination terminal connected for transmitting image data;
means for determining whether or not the destination terminal is a communication terminal manufactured by a same manufacturer as the communication terminal device in accordance with the manufacturer code received by the means for receiving;
means for notifying a determination result of the means for determining to an operator and urging the operator to perform a selection operation for selecting either an execution or a suspension of the transmission of the image data;
means for operating for the operator to perform the selection operation for selecting either the execution or the suspension of the transmission of the image data; and
means for controlling to execute or cancel the transmission of the image data in accordance with the selection operation performed with respect to the means for operating when the selection operation is urged.

2. The communication terminal device according to claim 1, further comprising a secondary determining means for determining whether or not the destination terminal is a communication terminal manufactured in a same country as the communication terminal device in accordance with a manufactured country code received from the destination terminal,
wherein the means for notifying notifies a determination result of the secondary determining means to the operator and urges the operator to perform the selection operation for selecting either the execution or the suspension of the transmission of the image data.

3. The communication terminal device according to claim 1, wherein when a set time elapses under a state in which the selection operation is not performed with respect to the means for operating, the means for controlling cancels the transmission of the image data.

4. The communication terminal device according to claim 1, further comprising means for controlling to permit the transmission of the image data when a passcode entered by the operator matches with a passcode registered in the communication terminal device and the passcode is approved by the destination terminal and the passcode received from the destination terminal matches with the passcode registered in the communication terminal device.

5. The communication terminal device according to claim 1, further comprising means for setting a closed communication mode.

6. The communication terminal device according to claim 1, wherein the means for receiving receives the manufacturer code included in a nonstandard facilities signal.

7. A communication method comprising the steps of:
receiving a manufacturer code from a destination terminal connected for transmitting image data;
determining whether or not the destination terminal is a communication terminal manufactured by a same manufacturer as a communication terminal device in accordance with the manufacturer code received at the step of receiving;
notifying a determination result of the step of determining to an operator and urging the operator to perform a selection operation for selecting an execution or a suspension of a transmission of the image data;
waiting for the selection operation to be performed by the operator for selecting the execution or the suspension of the transmission of the image data; and
controlling to execute or cancel the transmission of the image data in accordance with the selection operation performed by the operator at the step of waiting.

8. The communication method according to claim 7, further comprising a secondary determining step of determining whether or not the destination terminal is a communication terminal manufactured in a same country as the communication terminal device from a manufactured country code received from the destination terminal.

9. The communication method according to claim 7, wherein at the step of controlling, after the step of waiting is stared, when a set time elapses without the selection operation being performed, the transmission of the image data is canceled.

10. The communication method according to claim 7, further comprising a step of permitting the transmission of the image data when a passcode entered by the operator matches with a passcode registered in the communication terminal device and the passcode is approved by the destination terminal and the passcode received from the destination terminal matches with the passcode registered in the communication terminal device.

11. The communication method according to claim 7, further comprising a step of setting a closed communication mode.

12. The communication method according to claim 7, wherein the receiving step includes a step of receiving a manufacturer code included in a nonstandard facilities signal.

13. A communication terminal device comprising:
a receiving unit that receives a manufacturer code from a destination terminal;
a determination unit that determines whether or not the destination terminal is a communication terminal manufactured by a same manufacturer as the communication terminal device in accordance with the manufacturer code;
a notification unit that notifies a determination result to an operator and urges the operator to select either to execute or suspend transmission of image data;
an operation unit for allowing an operator to select whether to execute or suspend transmission of image data; and
a transmission control unit that executes or suspends transmission of image data based on the operator's selection.

14. The communication terminal device according to claim 13, and further comprising:
a secondary determination unit for determining whether or not the destination terminal is manufactured in a same country as the communication terminal device in accordance with a manufactured country code received from the destination terminal.

15. The communication terminal device according to claim 13, wherein the transmission control unit cancels transmission of the image data when a set time elapses without a selection being made with the operation unit.

16. The communication terminal device according to claim 13, and further comprising:
a transmission restricting unit that permits transmission of the image data when a passcode entered by an operator matches a passcode registered in the communication terminal device and is approved by the destination terminal, and when a passcode received from the destination terminal matches the passcode registered in the communication terminal device.

17. The communication terminal device according to claim 13, wherein the receiving unit receives the manufacturer code from the destination terminal based on an entry of a calling number.

18. The communication terminal device according to claim 13, wherein the notification unit comprises a display unit that displays a message urging the operator to select whether or not to transmit the image data to the destination terminal.

19. The communication terminal device according to claim 18, wherein the display unit displays a first function key for the operator to select to execute transmission of image data and a second function key for the operator to select to suspend transmission of image data.

20. The communication terminal device according to claim 13, wherein the notification unit comprises a voice generator that generates a synthesized voice to notify the operator as to whether or not the destination terminal has been manufactured by the same manufacturer as the communication terminal device.

* * * * *